(12) United States Patent
Jappila et al.

(10) Patent No.: US 8,159,980 B2
(45) Date of Patent: Apr. 17, 2012

(54) PS NETWORK WITH CS SERVICE ENABLING FUNCTIONALITY

(75) Inventors: Petri Jappila, Helsinki (FI); Ivan Ore, Helsinki (FI); Uwe Schwarz, Veikkola (FI)

(73) Assignee: Nokia Corporation, Espoo (FI)

( * ) Notice: Subject to any disclaimer, the term of this patent is extended or adjusted under 35 U.S.C. 154(b) by 978 days.

(21) Appl. No.: 11/905,343

(22) Filed: Sep. 28, 2007

(65) Prior Publication Data

US 2008/0080428 A1 Apr. 3, 2008

Related U.S. Application Data

(60) Provisional application No. 60/848,646, filed on Oct. 3, 2006.

(51) Int. Cl.
*H04B 7/00* (2006.01)
*H04Q 7/00* (2006.01)
*H04L 12/66* (2006.01)

(52) U.S. Cl. ........ 370/310; 370/331; 370/352; 370/356; 455/436

(58) Field of Classification Search ............... None
See application file for complete search history.

(56) References Cited

U.S. PATENT DOCUMENTS

| | | | |
|---|---|---|---|
| 6,463,055 B1 | 10/2002 | Lupien et al. | |
| 7,502,615 B2 * | 3/2009 | Wilhoite et al. | 455/442 |
| 2002/0110104 A1 * | 8/2002 | Surdila et al. | 370/338 |
| 2004/0240430 A1 * | 12/2004 | Lin et al. | 370/352 |
| 2006/0268781 A1 * | 11/2006 | Svensson et al. | 370/331 |
| 2007/0014281 A1 * | 1/2007 | Kant | 370/352 |
| 2008/0026752 A1 * | 1/2008 | Flore et al. | 455/435.2 |
| 2008/0316998 A1 * | 12/2008 | Procopio et al. | 370/352 |

FOREIGN PATENT DOCUMENTS

WO  WO 01/93607 A1  12/2001

OTHER PUBLICATIONS

3GPP TR 23.819 v.1.2.0; 3rd Generation Partnership Project; Technical Specification Group Services and System Aspects; Study on Handling the Termination of Real-Time Sessions and calls (Release 7); 35 pgs.; (Sep. 2006).
Motorola; "Registering Terminal's CSI Capability"; S@-051325; 3GPP TSG SA WG2 Architecture; 2pgs.; (May 2005).
International Search Report, PCT/IB2007/002867 filed Oct. 1, 2007.

* cited by examiner

*Primary Examiner* — Kevin C Harper
*Assistant Examiner* — Christine Duong
(74) *Attorney, Agent, or Firm* — Harrington & Smith (57) ABSTRACT

Method and system for optimization of a handoff of a user equipment between packet switched and circuit switched networks in response to a request for circuit switched network services on the user equipment while the user equipment is resident on a packet switched only network. The system includes a mobile device, a first network, and a second network. The first network includes a third network and an interworking unit. The second network communicates with the first network. The mobile device sends registration information to the first network. The third network sends the registration information to the interworking unit. The interworking unit sends the registration information to the second network to provide a communication link between the mobile device and the second network.

22 Claims, 5 Drawing Sheets

MOBILE DEVICE AND NETWORK UNIT

PS NETWORK WITH CS SERVICE ENABLING FUNCTIONALITY

CROSS REFERENCE TO RELATED APPLICATION

This application claims priority of U.S. Provisional Patent Application Ser. No. 60/848,646, filed on Oct. 3, 2006, the entire contents of which are incorporated herein by reference.

BACKGROUND OF THE INVENTION

1. Field of the Invention

The present invention relates to optimization of handoffs of a user equipment between packet switched and circuit switched networks as a result of circuit switched network services being requested on the user equipment while resident on a packet switched only network.

2. Description of the Related Art

Traditionally, circuit switched (CS) mobile communication services, such as CS mobile voice communications, have been a foundational service for the cellular voice communication industry. However, current mobile devices or user equipment (UE) are generally capable of providing CS-type services over newer and more efficient packet switched (PS) networks, e.g., Internet/Wimax networks. However, the geographical coverage of PS networks is substantially less than the coverage of the more established CS networks, such as a Global System for Mobile Communications (GSM) networks. One challenge with attempting to provide CS services though a PS network is that not all CS-type services are easily provided through the backbone of the PS network.

Another current type of network is a hybrid packet switched/circuit switched network (PS+CS) or a service enabling network (PS+Cse network), which does not need to support all of the CS network functionalities in one type of network. However, in PS+CS networks, challenges exist with the added complexity of the architecture, protocols, and complex implementation. Therefore, when CS-type services are needed, PS+Cse networks are configured to redirect the UE to the CS network for those particular services. Additionally, the UE does not need to support all of the CS services through the PS network, as the UE has the capability to hand-off from the PS to the CS network for services not easily supported by the PS network backbone.

However, a method or an apparatus is needed to determine when the UE should hand-off from the PS network to the CS network, or a method or apparatus is needed to generate and/or transmit information on how the UE may use the CS services when the current PS network does not provide a particular CS-type service through the PS network. Such method or apparatus is not presently available.

Therefore, there is a need to provide information on when the UE may hand-off to a CS service network when a current PS network does not provide support for a CS-type service requested by the UE. Fulfillment of such need will allow the UE to use PS services via a PS optimized network, while still being able to hand-off to a CS capable network when needed to access communications or services that are better or only provided by the CS service network. Generally, the PS network only needs to inform the UE and/or other network devices how and/or when CS service should/could be used. PS+Cse networks are also able to inform the UE and/or other network components about a UE terminated CS service and provide handoff assistance to the UE to move to/start to use the CS service network as required.

Additionally, fast mobile access to Internet and other PS services plays an important role in the telecommunications industry, as it is the driver for developing various new access technologies like High-Speed Downlink Packet Access (HSDPA), Worldwide Interoperability for Microwave Access (WiMax), 3GPP-LTE (3.9G), IPWs, TDD, and many more. Fast DSL-type service quality (high bandwidth and low delays) is important. Additionally, support of legacy systems to guarantee service continuation when starting deployment of the new technology is also an important consideration. Since it is expected that increasingly more traffic will shift from the CS to the PS domain, while still demanding the services that are essentially exclusively provided by the CS domains, the ability to merge the capabilities of both types of networks remains important.

Examples of services that may take over traffic from the CS domain in more current types of networks, such as PS-type networks, include voice over internet protocol (VoIP) or PS video. Further, an Internet High Speed Packet Access (iHSPA) is one example of such a wireless broadband system. The iHSPA provides the user with a cost advantage because it is both a lean architecture and a PS-only network. The end-user's UE is the same as a "normal" High-Speed Downlink Packet Access (HSDPA)/High-Speed Uplink Packet Access (HSUPA) network, and thus, the user may expect the UE to behave in the same way it always did with previous network communications.

The implementation of the iHSPA is facing the same challenges noted above with respect to the use of PS-type networks providing CS-type services. Due to the PS-only architecture of the iHSPA, the handheld iHSPA UE should be served in the iHSPA when it requests a PS service, and in Wideband Code Division Multiple Access (WCDMA) (or GSM) when it requests a CS or a PS & CS service. However, a challenge with this methodology is that the UE cannot be directed to the correct system before the request is actually made, as the network cannot know which service will be requested before the UE actually makes the formal request. The user manually selecting the appropriate network or system may be in a situation where the network or system is unknown before the formal request is to be sent. However, this scenario is both unlikely and undesirable to the operator of the UE. Therefore, redirection of the UE to the correct network or system should be completed during a call setup phase, if the challenges and problems associated with conventional UE transitions are to be solved.

BRIEF DESCRIPTION OF THE DRAWINGS

Further exemplary embodiments, details, advantages, and modifications of the present invention will become apparent from the following detailed description of the preferred exemplary embodiments which is to be taken in conjunction with the accompanying drawings, in which.

DETAILED DESCRIPTION OF PREFERRED EXEMPLARY EMBODIMENTS

Prior to the detailed discussion of exemplary embodiments of the invention, the following terms used in the present application are defined as follows: UE generally defines a mobile terminal, PC, or other device capable of wireless communications; CS network generally defines a network that provides CS based services, such as voice, SMS, or related supplementary services, which can include support for PS services (e.g. GSM, 3G WCDMA); PS only network generally defines a network that provides only PS connectivity, e.g., Wireless LAN, WiMax; PS network with CS service enabling (PS+Cse network) generally defines a network that can allow UE to use CS services and/or receive incoming CS services, and can be implemented by such or combining PS only network and PS+CS inter working functionality; PS network generally defines a PS only network or a PS+Cse network; PS+CS network generally defines a network that can provide both CS and PS services; PS+CS inter working functionality generally defines a functionality that provides means to PS+CS communication and/or provides information about CS usage, which can be separate functionality or integrated to a PS+Cse network (e.g. SGSN/AAA can be implemented as such); iHSPA generally defines an internet-HSPA (high speed packet access); PS generally defines packet switched and CS generally defines circuit switched; HSDPA generally defines high-speed downlink packet access; HSUPA generally defines high-speed uplink packet access; VoIP generally defines voice over internet phone (IP); 3GPP-LTE generally defines a third generation partnership project long-term evolution technology; DSL generally defines a digital subscriber line; and IPW's TDD generally defines a 3GPP technology by IPWireless, competing with Nokia's WCDMA/HSDPA and iHSPA.

PS+Cse or PS is an only type network system that may provide support for CS service usage for the end user. However, PS+Cse networks themselves do not generally provide the CS service. Rather, a UE requiring a CS service not easily provided by a PS-based network is generally handed off to a pure CS-type network for the duration of use of the CS-type service, and then transitioned back to the PS-based network once the need for the CS-only-type service has been satisfied. More particularly, although CS services are generally supported in most end user terminals, not all CS services, such as voice via VoIP/IMS, SMS, etc., are supported by typical PS service networks. Therefore, a PS+Cse network system may enable a UE to use traditional CS network services, e.g., WCDMA or 2G, by actively connecting the UE to a CS network for those services. Therefore, the UE may switch to the PS service network, e.g., Third Generation Partnership Project (3GPP) PS+CS network, disable PS services during the CS usage, e.g., GSM without DT mode, or use 2 radios for the time period when CS service is actively used, e.g., during a voice call. However, the various exemplary embodiments may not be necessarily directed to preventing the UE from using PS services, e.g., VoIP. Rather, in at least one exemplary embodiment, the goal is to enable smooth transition between CS and PS networks for the UE as transitional service is required by the UE.

Normally, for a UE to utilize CS services, registration for the CS services is required so that the CS network may provide support for UE originated and terminated calls. In most cases, CS service may be provided via legacy network backbones that have larger geographic coverage areas. In at least one exemplary embodiment, a PS+Cse network may be configured to allow for registration to CS services, may be configured to inform the respective networks and/or the UE about the UE initiating and/or terminating CS network services, and may be configured to help the UE handover to the CS network when CS related services are desired. Therefore, a packet switching network in at least one exemplary embodiment may be configured to allow registration to CS services and to provide information about the CS services, i.e., a PS+Cse-type network in at least one exemplary embodiment may allow the UE to register with the CS service network using the PS network. The UE may register normally and be implemented through established 3GPP network procedures, e.g., using network operation mode.

In PS-type networks, generally the UE assumes that it may also use CS services, if registration succeeds. It may be also possible to register the UE via the PS network, e.g., using IP-based communication to the new PS+CS service inter working functionality. This enables a novel feature of the present invention, i.e., the UE may be connected only to the PS network, e.g., a WiMAX/WLAN/Bluetooth/3GPP PS-only carrier and still allows access to CS services. Optionally, the UE may be configured to enable CS radio communications, only when truly needed, i.e., when CS service is actually requested by the UE. Additionally, exemplary embodiments may contemplate that a PS+CS inter working functionality unit may periodically send messages, so that the UE may know that it is still connected to the PS+CS inter working functionality unit. The UE may also check for connection on its own in some exemplary embodiments of the invention.

Figure 1:
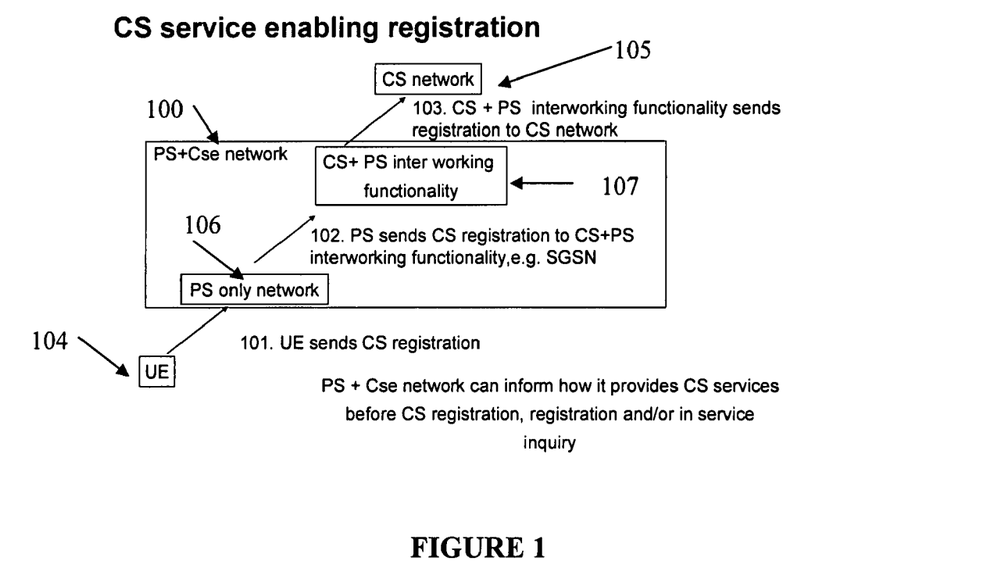
FIG. 1 illustrates a CS service enabling registration process, in accordance with an exemplary embodiment of the present invention.
Figure 6:
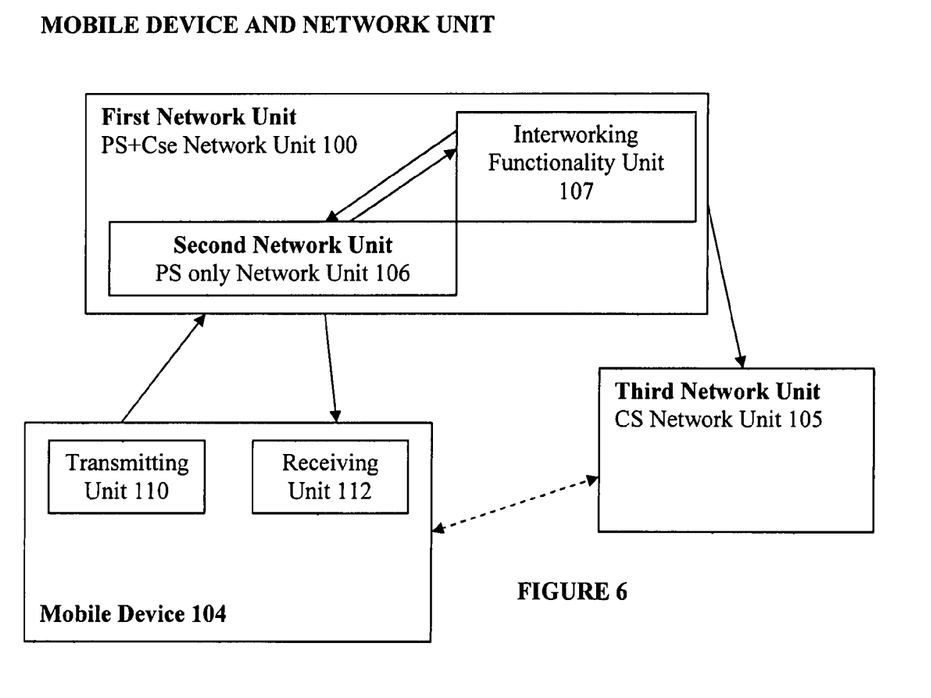
FIG. 6 illustrates a mobile device and network unit, in accordance with an exemplary embodiment of the present invention.
Figure 7:
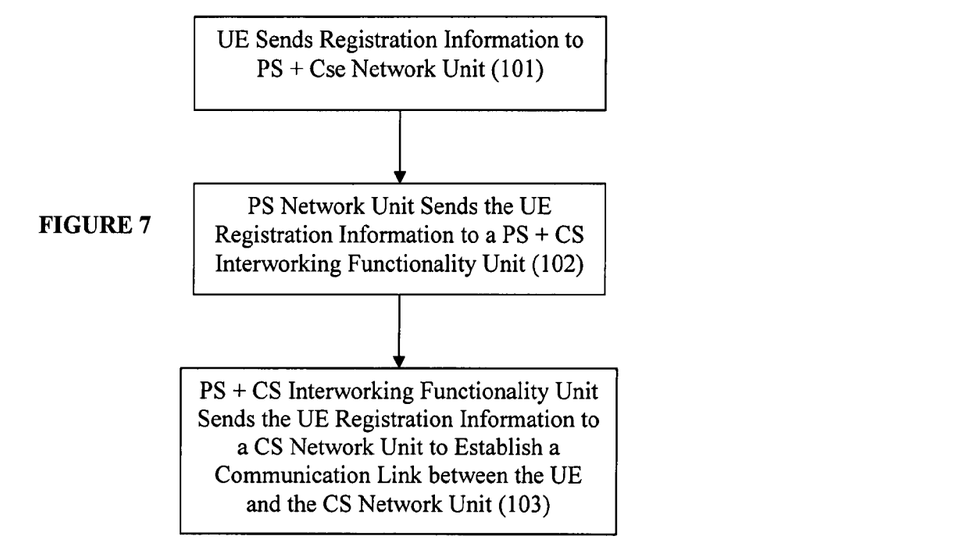
FIG. 7 illustrates a method of transmitting registration information of a mobile device to a circuit switched network, in accordance with an exemplary embodiment of the present invention.

More particularly, FIG. 1, and FIG. 7 illustrate a CS service enabling registration process, in accordance with an exemplary embodiment of the present invention. FIG. 6 illustrates a mobile device and network unit, in accordance with an exemplary embodiment of the present invention. As illustrated in FIG. 1, FIG. 6, and FIG. 7, the UE operating in a PS-type network may switch to a CS-type network in order to fulfill a service request on the UE that is best suited for a CS-type network. The registration process generally involves a UE 104 communicating with a PS+Cse network 100, which may be in communication with a CS network 105. In the CS service enabling registration process, a transmitting unit 110 of the UE 104 sends CS registration information to the PS+Cse network 100 at step 101. The registration information may, for example, include one or more of the following parameters:

1) The UE prefers/allows PS-only network communications;

2) The UE prefers/allows PS+CS network communications with full CS service support; and/or 3) The UE prefers/allows PS+Cse network (with CS service registration and/or support for out/incoming CS service, but actual CS services (e.g. voice call/SMS) will not be used via it) communications.

This information is transmitted between the UE 104 and the network unit 100 providing the ability for the network unit 100 to accept preferred/allowed UEs. Additionally, the network unit 100 may inform the UE and/or other network units that the PS network unit 106 has at least one of the following characteristics:

1) The PS network unit 106 provides/allows only pure PS users, i.e., PS only;

2) The PS network unit 106 provides/allows CS registration and/or support for CS UE terminated calls, e.g., PS+Cse;

3) The PS network unit 106 provides/allows full CS service support (and is a PS+CS network unit), PS+CS;

4) The PS network unit 106 provides support for determining what network unit should be select for CS service;

5) The PS network unit 106 provides updated information about possible CS network units, e.g., when the UE 104 moves to a new coverage area; and 6) The PS network unit 106 may instruct the UE 104 to move to a more appropriate, correct, or authorized network in a UE registration phase. This information relating to the PS network unit 106 is received by the receiving unit 112 of the UE 104.

At step 102 of the CS service enabling registration process, the PS network unit 106 may send the CS registration information received from the UE 104 to the PS+CS interworking functionality unit 107. Thereafter, at step 103, the PS+CS interworking functionality unit 107 may send the UE registration information to the CS network unit 105, where the information is processed and the communication link between the UE 104 and the CS network unit 105 is established. Thereafter, CS communications may be generally established in the UE 104 and the service enabling registration process of the exemplary embodiment is completed.

Figure 2:
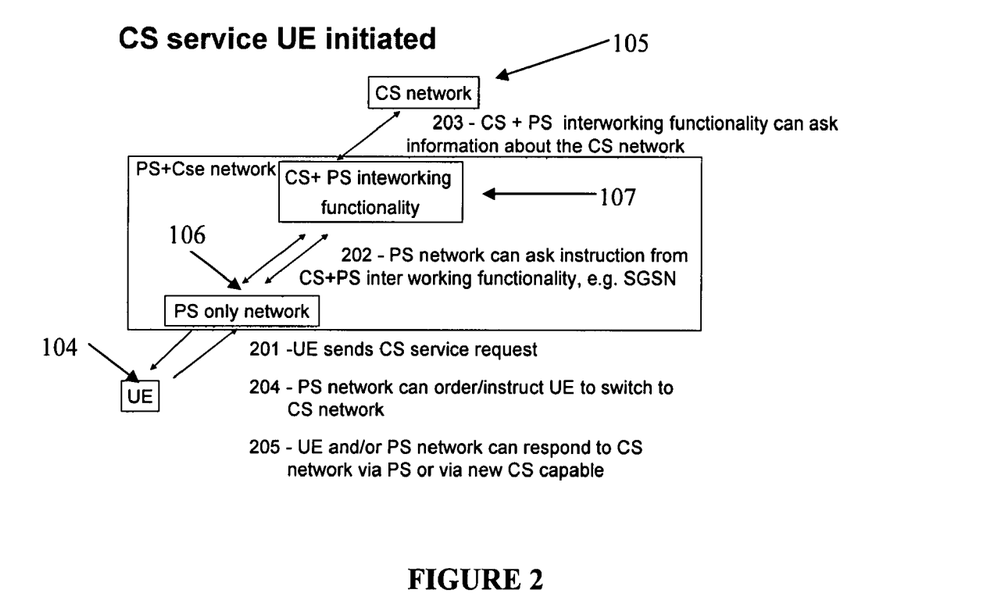
FIG. 2 illustrates a user equipment circuit switched (CS) service initiation process, in accordance with an exemplary embodiment of the present invention.
Figure 8:
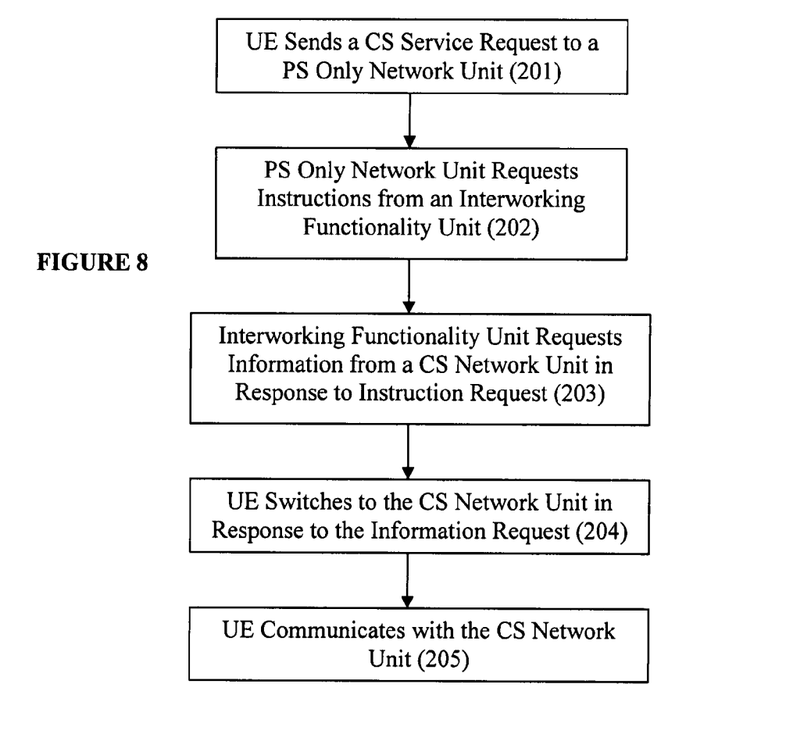
FIG. 8 illustrates a method of initiating circuit switched service at a mobile device, in accordance with an exemplary embodiment of the present invention.

FIG. 2 and FIG. 8 illustrate a hybrid hardware configuration and methodology of a user equipment CS service initiation process, in accordance with an exemplary embodiment of the invention. In a situation where the UE 104 originates a CS call service, the UE 104 may inquire as to what CS network unit 105 the UE 104 should select from a PS+Cse network unit 100. Alternatively, the UE 104 may be configured to autonomously seek and switch to a CS network unit 105 with true support for CS service and without support from the PS-only network unit 106. Additionally, the UE 104 may use pre-communicated/configured or found information about CS service, and/or the PS+Cse network unit may redirect the user to a CS-capable network by itself, when actual CS service is attempted, if the UE does not have the capability or compatibility to communicate with PS+Cse networks.

More particularly, as illustrated in FIG. 2 and FIG. 8, the process of the UE 104 initiating CS service generally begins at step 201, where the UE 104 sends a CS service request to the PS-only network unit 106. Thereafter, the PS network unit 106 will ask for instruction from the PS+CS interworking functionality unit 107, which may be a SGSN, for example, at step 202. At step 203, the PS+CS interworking functionality unit 107 inquires about information from the CS network unit 105. At step 204, the PS network may order the UE 104 to switch to the CS network unit 105, and at step 205, the UE 104 and/or the PS network unit 106 may respond to the CS network unit 105 via PS communication or through a new CS-capable communication.

In another exemplary embodiment of the invention, which may be combined with or added to other exemplary embodiments described herein, the UE 104 may terminate CS call service and return to service within a PS-type network. In this exemplary embodiment, the PS+Cse network unit 100 may be configured to inform the UE 104 that a CS-type call is incoming. The network may then use existing information interfaces, e.g., 3GPP paging, which work easily over a PS network using network mode NMO-1. Alternatively, or in conjunction with the previously discussed exemplary embodiment, the UE 104 may be directly connected to PS+CS interworking functionality unit 107, e.g., via an IP-based communication, and the PS-only network unit 106 with extra PS+CS inter working functionality unit may provide means to implement a PS+Cse type network. The PS+Cse network unit 100 may provide information about the preferred CS network. The information may include more exact information, such as in cellular network (frequency, cell, etc), or the UE 104 may inquire about more information or use existing information. The PS+Cse Network unit 100 may also request the UE 104 to move to the CS network unit 105 and send information to the CS network unit 105 that it has/will be moved and/or ask the CS-capable network to make preparations. Further, the UE 104 or the CS network unit 105 may inform the respective networks that it has received information about a new UE terminated service, and when the UE 104 has or will be moved, e.g, to a GSM/3GPP CS+(PS) type network. In this exemplary embodiment, the UE 104 or the CS network unit 105 may decide to continue to use PS services via the PS-only network, e.g., PS via WLAN/WiMAX and CS via GSM. This enables the UE 104 to use a single radio in almost all scenarios, while still allowing for two radio operation for short time periods, e.g., during a SMS/Voice call.

Figure 3:
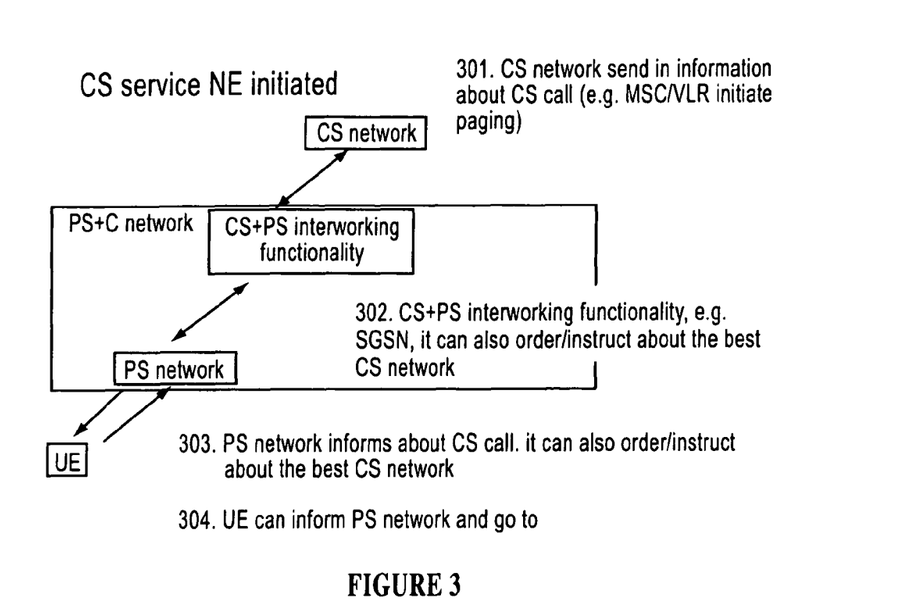
FIG. 3 illustrates a user equipment network element (NE) initiation process, in accordance with an exemplary embodiment of the present invention.

FIG. 3 illustrates another exemplary embodiment of the invention, wherein a UE NE initiation process of the invention is conducted. At step 301 of the initiation process, the CS network sends information about a CS call, e.g., MSC/VLR initiate paging. At step 302, PS+CS interworking functionality unit, e.g., SGSN, orders or instructs the UE regarding the most appropriate CS network. At step 303, the PS network unit informs the UE about the CS call, and it may also order or instruct the UE regarding the most appropriate CS network. At step 304, the UE may inform the PS network unit.

It may be possible to use new protocols, protocol enhancements, or even existing protocols to implement various exemplary embodiments of the present invention. This enables use of CS service via legacy networks, and new services may be implemented from a clean start. Additionally, the same concept may be used to help in PS+CS inter working, e.g., VoIP calls may be transferred to GSM. For example, a PS network unit may notice that a UE is moving towards an out of coverage situation and sends information about a CS network unit that is capable of maintaining coverage for the UE. The UE may then be transitioned to the CS network unit without terminating the services that are currently being provided by the PS-type network. PS+CS functionality unit may also make preparations to allow for a seamless handover, e.g., to GSM. PS network units may inform devices in the network about the availability of the CS network unit and give instructions to the UE on how to operate in a handover to a CS network unit. PS+CS functionality unit may also make preparations in CS to enable truly seamless handover.

In another exemplary embodiment of the invention, two separate methods of handling CS voice call requests in the iHSPA are provided. Generally speaking, the iHSPA may be a different kind of network built on the basis of legacy WCDMA (3.5G). This means that accessibility and mobility may be limited by the functionalities supported in 3.5G. Further, each i-HSPA component (Node B, AAA server, HA and terminal) generally has a fixed internet IP address, which may be the basis for its internet architecture. Thus i-HSPA is generally thought of as a streamlined architecture wherein the subset of functions of the RNC, SGSN and GGSN are implemented by the base stations. In other words, the base stations provide more direct internet access via the Gi interface.

One method of handling CS voice requests from the UE is for mobile originated calls (MOC), and the other method is for mobile terminated calls (MTC), and the current exemplary embodiment combines standard procedures in the handling of the CS voice call requests in the right order, with suitable signalling causes, and with correct timing to achieve a redirection of HSPA UEs during the CS call setup procedure. The combination of the present exemplary embodiment results in reasonably small delays for CS call setup, minimum CS functionality in the iHSPA network (cost benefit), and full support of standard HSPA handheld terminals (fast take-up of new technology). These principles apply not only to the current exemplary embodiment, but may also be applied to PS-only networks in a multi-radio (PS & CS) environments with equal effectiveness.

Figure 4:
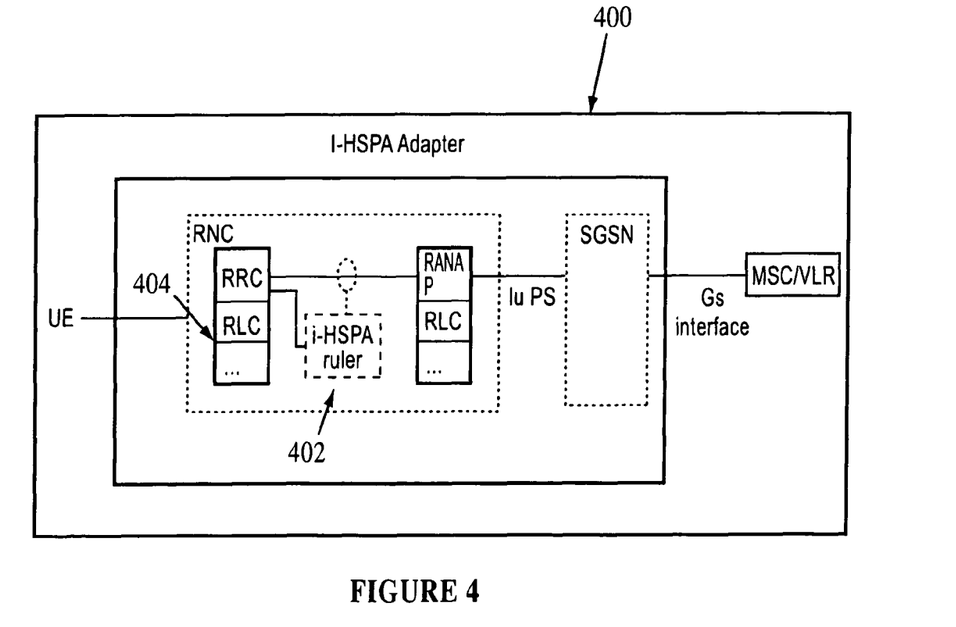
FIG. 4 illustrates an iHSPA adapter, ruler, and the associated network elements of an embodiment, in accordance with an exemplary embodiment of the present invention.

In at least one exemplary embodiment of the present invention, an iHSPA ruler block 402 is provided inside of an i-HSPA adapter 400, as illustrated in FIG. 4. The iHSPA ruler block 402 commands the RRC block 404 to send specific RRC messages, according to the input received from Iu-PS (RANAP) or the RRC signalling itself. FIG. 4 illustrates the functional location of the iHSPA ruler and relevant network elements (SGSN, RNC and MSC/VLR). The iHSPA adapter may be located inside the Node B.

In operation, different procedures may apply according to the call mode. During MOC (originated by the iHSPA subscriber), the UE sends the "RRC: connection setup"-message, and the iHSPA ruler 401 reads the RRC message and extracts the content of the "Establishment cause" IE, which may contain information of the requested service class. If the "Establishment cause" identifier corresponds to a "Originating conversational call," then the iHSPA ruler commands the RRC block to send the "RRC: connection reject" message, commanding the UE to move to another WCDMA carrier (where CS service is supported). The reject message might include synchronisation, system information, and other information related to the target cell to speed up the time the UE needs before accessing the target cell. The UE then moves to the appointed WCDMA carrier, camps on the network, and re-attempts the MOC. The re-attempt is done automatically so the subscriber does not have to reinitiate the call process, i.e., the process described in the current exemplary embodiment may be generally transparent to the user. For this specific purpose a wait timer that is normally applied for call re-attempts might be skipped or adjusted accordingly.

In MTC situations, the MSC/VLR may send a paging to the SGSN (located in the iHSPA adapter), and the MSC/VLR will start the retransmission timer. The SGSN forwards the paging to the RNC functional block, and subsequent procedures follow as normal, for example, RNC->UE (RRC: connection request), and UE->RNC (RRC: connection setup). Upon reception of the "RRC: connection setup", the iHSPA ruler 402 commands the RNC block 404 to send the "RRC: connection reject" message, commanding the UE to move to another WCDMA carrier (where CS service is supported). The UE moves to the appointed WCDMA carrier, and camps on the WCDMA network. In parallel, retransmission timer of MSC/VLR expires, and the MSC/VLR resend the paging to the correct network (since VLR is aware of the new location of the subscriber). However, due to the strong requirement of fast wireless broadband access, the UE may generally camp in the iHSPA by default, as the iHSPA network, although designed as PS-only, still must understand and correctly handle CS call requests of handheld terminals both in MOC and MTC.

Generally, the requirements for the above described exemplary embodiment to successfully operate are that the interface between an iHSPA node and MSC should be implemented (Gs interface) The network is generally a PS-only network, but acts as CS/PS network in the call setup, and conversational PS calls are generally not supported in the iHSPA as the conversational PS calls and CS conversational calls use the same identifier IE and could possibly conflict. However, a PS conversational call is not typically supported by the iHSPA, so this restriction may not have a negative impact.

Figure 5:
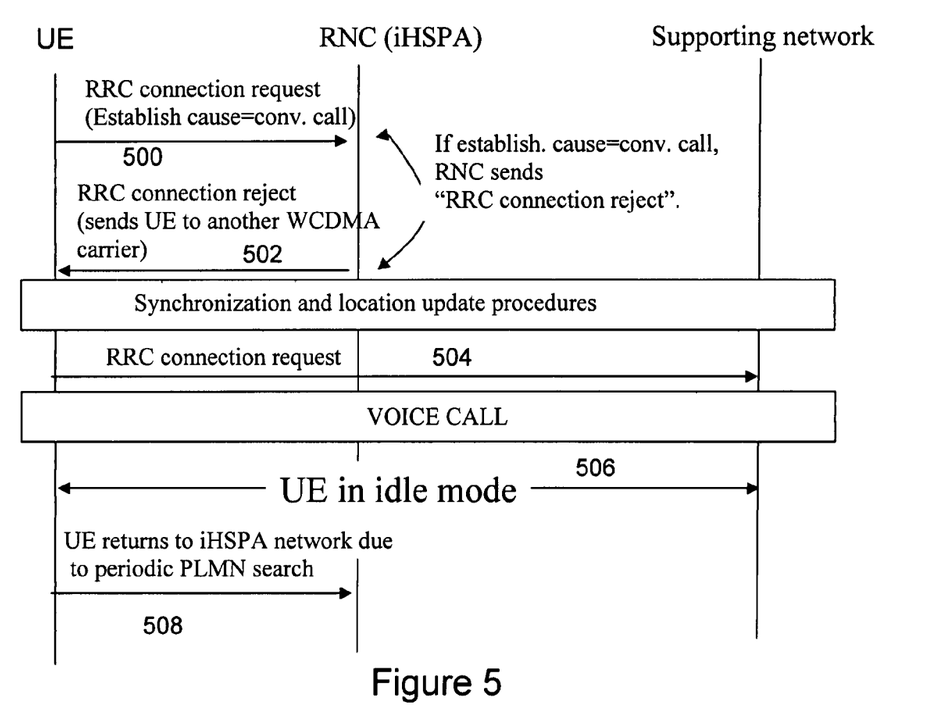
FIG. 5 illustrates a method of mobile originated call (MOC) (voice) handling in iHSPA, in accordance with an exemplary embodiment of the present invention.

FIG. 5 illustrates a method of the invention for MOC (voice) handling in the iHSPA. At step 500 of the method, a RRC connection request (Establish cause=conv. call) is sent from the UE to the RNC. At step 502, the RRC connection rejection occurs, which may generally include sending the UE to another WCDMA carrier. If, at steps 500 and 502, establish cause=conv call, then the RNC will generally send "RRC connection reject."

Thereafter, synchronization and location update procedures are conducted, and at step 504, the UE sends an RRC connection request to the supporting network. In this step of the method, the UE may automatically re-attempt the voice call in the supporting network, only if the supporting network is located in another WCDMA carrier on the same PLMN or equivalent PLMN. Thereafter, the voice call is conducted, and the UE switches into an idle mode, as illustrated at step 506. The UE then returns to the iHSPA network due to a periodic PLMN search, and an interval between PLMN search attempts is generally stated inside the SIM/USIM, as illustrated in the method as step 508. Further, the smallest interval value may be 6 minutes, however, exemplary embodiments of the present invention are not intended to be limited to any particular interval value.

Therefore, MT voice call handling in the iHSPA generally includes a calling party initiating a call to an iHSPA subscriber, through a PLMN and an MSC. A page, in parallel, is then sent to the RNC, and upon receiving the page from the Gs interface, paging is sent to the iHSPA subscriber. Then the UE sends the RRC connection request, and the network sends the RRC connection rejection, ordering the UE to go to a GSM or another WCDMA carrier. The call is thus transferred to another network, i.e., the supporting network, after a timer has expired or another predetermined or calculated triggering event occurs. Thereafter, the supporting network sends the paging message to the iHSPA subscriber, and the iHSPA subscribers will generally already be camping on this network before the paging is sent, which makes the page easy to receive.

Generally speaking, sending the UE to the supporting network whenever a CS voice call is originated, may present challenges, as Voice/PS calls are only identified after a RRC connection when the UE sends the direct transfer message (requesting a voice call). Therefore, exemplary embodiments of the present invention address this challenge by identifying the nature of the call service from the "RRC connection request" message, i.e., step 500 in FIG. 5. Thus, the UE specifies the kind of call/traffic class that is intended to be used, and this information is used by the RNC to determine which type of a signalling network to use, and whether or not to reserve a dedicated transport channel (DCH) or for loading actions.

In one exemplary embodiment of the invention, a method for handing-off a UE from a PS network to a CS network is provided. The method includes a UE sending CS registration information to a PS+Cse network unit. The PS type network unit may inform the UE and/or other network units that the PS network has certain characteristics. The PS network may send the CS registration information received from the UE to a PS+CS interworking functionality unit. The PS+CS interworking functionality unit may send the UE registration information to the CS network unit, where the information is processed and the communication link between the UE and the CS network unit is established.

In another exemplary embodiment of the invention, a methodology for a user equipment CS service initiation process is provided. In a situation where the UE originates CS call service, the UE may inquire as to what CS network the UE should select from a PS+Cse network unit. The process begins when the UE sends a CS service request to the PS only network unit. Thereafter, the PS network unit asks for instructions from the PS+CS interworking functionality unit, and the PS+CS interworking functionality unit inquires about information from the CS network. Then, the PS network orders the UE to switch to the CS network, and the UE and/or the PS network unit respond to the CS network unit via a PS communication or through a new CS-capable communication.

In another exemplary embodiment of the invention, a method for initiation is provided. In the method, a CS network unit sends information about a CS call, and a PS+CS interworking functionality unit instructs the UE regarding the most appropriate CS network selection. Then, the PS network unit informs the UE about the CS call, and instructs the UE regarding the most appropriate CS network. The method generally ends when the UE informs the PS network of the CS network initiation.

In another exemplary embodiment of the invention, a method for voice handling in an iHSPA is provided. In the method, a UE sends a connection setup message, and an iHSPA ruler reads the message and extracts content that contains information of the requested service class. In accordance with the information, the iHSPA ruler commands a Radio Resource Control (RRC) block to send the connection status message, commanding the UE to move to a WCDMA carrier where CS service is supported. The UE then moves to the appointed WCDMA carrier, camps on the network, and re-attempts a Mobile Originated Call (MOC).

One having ordinary skill in the art will readily understand that the invention as discussed above may be practiced with steps in a different order, and/or with hardware elements in configurations which are different than those which are disclosed. Therefore, although the invention has been described based upon these preferred exemplary embodiments, it would be apparent to those of skill in the art that certain modifications, variations, and alternative constructions would be apparent, while remaining within the spirit and scope of the invention. Additionally, those skilled in the art, after reading the current disclosure, will recognize that features from the above noted embodiments may be combined to generate embodiments not expressly described herein, however, these modifications generating new embodiments are intended to be included within the scope of the invention.

The invention claimed is:

1. An apparatus, comprising:
   a transmitter configured to transmit registration information to a first network unit, where the registration information is for a mobile device operating in a packet switched network, and where the first network unit is part of the packet switched network;
   a receiver configured to receive information from said first network unit relating to a second network unit that is part of the packet switched network, and further configured to receive an instruction from said second network unit, said instruction relating to a third network unit that is part of a circuit switched network; and
   a communication unit configured to initiate a communication link with said third network unit based upon said transmitted registration information, said received information relating to said second network unit, and said instruction received from said second network unit.

2. The apparatus of claim 1, wherein said registration information comprises at least one parameter of said mobile device configured to allow only packet switched network communications, said mobile device configured to allow packet switched and circuit switched network communications with full circuit switched service support, and said mobile device configured to allow a service enabling packet switched and circuit switched network communication with at least one of circuit switched registration and support for incoming and outgoing circuit switched service.

3. The apparatus of claim 1, wherein said information from said first network unit relating to said second network unit comprises at least one characteristic of said second network unit configured to allow only packet switched users, said second network unit configured to allow at least one of circuit switched registration and support circuit switched mobile device terminated calls, said second network unit configured to allow circuit switched service support and packet switched and circuit switched service support, said second network unit configured to provide updated information about possible circuit switched networks, when said mobile device moves to a new coverage area, and said second network unit configured to instruct said mobile device to move to another authorized network unit during a mobile device registration phase.

4. The apparatus of claim 1, wherein said registration information comprises circuit switched registration information.

5. The apparatus of claim 1, wherein said first network unit comprises a service enabling packet switched and circuit switched network unit.

6. The apparatus of claim 1, wherein said first network unit further comprises an interworking unit.

7. The apparatus of claim 1, wherein said second network unit comprises a packet switched only network unit.

8. A method, comprising:
   transmitting registration information to a first network unit, where the registration information is for a mobile device operating in a packet switched network, and where the first network unit is part of the packet switched network;
   receiving information from said first network unit relating to a second network unit that is part of the packet switched network;
   receiving an instruction from said second network unit relating to a third network unit that is part of a circuit switched network; and
   initiating a communication link with said third network unit based upon said transmitted registration information, said received information relating to said second network unit, and said instruction from said second network unit.

9. The method of claim 8, wherein said transmitting comprises transmitting said registration information comprising at least one parameter of a mobile device configured to allow only packet switched network communications, said mobile device configured to allow packet switched and circuit switched network communications with full circuit switched service support, and said mobile device configured to allow a service enabling packet switched and circuit switched network communication with at least one of circuit switched registration and support for incoming and outgoing circuit switched service.

10. The method of claim 8, wherein said receiving information comprises receiving information comprising at least one characteristic of said second network unit configured to allow only pure packet switched users, said second network unit configured to allow at least one of circuit switched registration and support circuit switched mobile device terminated calls, said second network unit configured to allow circuit switched service support and packet switched and circuit switched service support, said second network unit configured to provide updated information about possible circuit switched networks, when said mobile device moves to a new coverage area, and said second network unit configured to instruct said mobile device to move to another authorized network unit during a mobile device registration phase.

11. The method of claim 8, wherein said transmitting comprises transmitting said registration information comprising circuit switched registration information.

12. The method of claim 8, wherein said transmitting comprises transmitting said registration information to said first network unit comprising at least one of a service enabling packet switched or circuit switched network unit and an interworking unit.

13. The method of claim 8, wherein said receiving information from said first network unit relating to said second network unit comprising a packet switched only network unit.

14. An apparatus, comprising:
a receiver configured to receive registration information from a mobile device in a packet switched network; and
an interworking unit in said packet switched network configured to receive said registration information from said receiver, and further configured to transmit said registration information to a network unit in a circuit switched network, and configured to transmit information relating to said receiver to said mobile device for establishing a communication link between said mobile device and said network unit in said circuit switched network.

15. The apparatus of claim 14, wherein said receiver comprises a packet switched only network unit.

16. The apparatus of claim 14, wherein said registration information comprises at least one parameter of said mobile device configured to allow only packet switched network communications, said mobile device configured to allow packet switched and circuit switched network communications with full circuit switched service support, and said mobile device configured to allow a service enabling packet switched and circuit switched network communication with at least one of circuit switched registration and support for incoming and outgoing circuit switched service.

17. The apparatus of claim 14, wherein said information transmitted to said mobile device comprises at least one characteristic of said packet switched network configured to allow only packet switched users, said packet switched network configured to allow at least one of circuit switched registration and support circuit switched mobile device terminated calls, said packet switched network configured to allow circuit switched service support and packet switched and circuit switched service support, said packet switched network configured to provide updated information about possible circuit switched networks, when said mobile device moves to a new coverage area, and said packet switched network configured to instruct said mobile device to move to another authorized network unit during a mobile device registration phase.

18. A method, comprising:
receiving registration information from a mobile device in a packet switched network at a receiver in the packet switched network;
transmitting the received registration information to an interworking unit in the packet switched network;
transmitting said registration information from said interworking unit to a network unit in a circuit switched network; and
transmitting information relating to said receiver to said mobile device for establishing a communication link between said mobile device and said network unit in said circuit switched network.

19. The method of claim 18, wherein receiving comprises receiving said registration information by a packet switched only network unit.

20. The method of claim 18, wherein said receiving comprises receiving said registration information comprising at least one parameter of said mobile device configured to allow only packet switched network communications, said mobile device configured to allow packet switched and circuit switched network communications with full circuit switched service support, and said mobile device configured to allow a service enabling packet switched and circuit switched network communication with at least one of circuit switched registration and support for incoming and outgoing circuit switched service.

21. The method of claim 18, wherein said transmitting said information comprises transmitting information comprising at least one characteristic of said packet switched network configured to allow only packet switched users, said packet switched network configured to allow at least one of circuit switched registration and support circuit switched mobile device terminated calls, said packet switched network configured to allow circuit switched service support and packet switched and circuit switched service support, said packet switched network configured to provide updated information about possible circuit switched networks, when said mobile device moves to a new coverage area, and said packet switched network configured to instruct said mobile device to move to another authorized network unit during a mobile device registration phase.

22. A mobile device, comprising:
transmission means for transmitting registration information from said mobile device when operating in a packet switched network to a first network unit in the packet switched network; receiving means for receiving information from said first network unit relating to a second network unit in the packet switched network and for receiving an instruction from said second network unit, said instruction relating to a third network unit in a circuit switched network; and communication means for initiating a communication link between said mobile device and said third network unit based upon said transmitted registration information, said received information relating to said second network unit, and said instruction from said second network unit.

* * * * *

UNITED STATES PATENT AND TRADEMARK OFFICE
CERTIFICATE OF CORRECTION

PATENT NO.         : 8,159,980 B2
APPLICATION NO.    : 11/905343
DATED              : April 17, 2012
INVENTOR(S)        : Jappila et al.

It is certified that error appears in the above-identified patent and that said Letters Patent is hereby corrected as shown below:

Claim 6, col. 10, line 41 delete "further".

Signed and Sealed this
Nineteenth Day of June, 2012

David J. Kappos
*Director of the United States Patent and Trademark Office*